US012692156B2

(12) United States Patent
  Øien

(10) Patent No.: US 12,692,156 B2
(45) Date of Patent: Jul. 28, 2026

(54) ABSORPTION COLUMN COMPRISING A FEED BOX HAVING A SERRATED WEIR AND A STRUCTURED PACKING AND PROCESS FOR THE PRODUCTION OF NITRIC ACID

(71) Applicant: Yara International ASA, Oslo (NO)

(72) Inventor: Halvor Øien, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 824 days.

(21) Appl. No.: 17/919,794

(22) PCT Filed: Apr. 28, 2021

(86) PCT No.: PCT/EP2021/061153
  § 371 (c)(1),
  (2) Date: Oct. 19, 2022

(87) PCT Pub. No.: WO2021/219733
  PCT Pub. Date: Nov. 4, 2021

(65) Prior Publication Data
  US 2023/0202845 A1    Jun. 29, 2023

(30) Foreign Application Priority Data

Apr. 29, 2020    (EP) ..................................... 20171996

(51) Int. Cl.
  *B01D 53/00*      (2006.01)
  *B01D 53/14*      (2006.01)
  (Continued)

(52) U.S. Cl.
  CPC .......... *C01B 21/40* (2013.01); *B01D 53/1456* (2013.01); *B01D 53/185* (2013.01);
  (Continued)

(58) Field of Classification Search
  CPC ..... C01B 21/40; C01B 21/46; B01D 53/1456; B01D 53/185; B01D 53/56; B01D 53/78;
  (Continued)

(56) References Cited

U.S. PATENT DOCUMENTS 4,062,928 A    12/1977   Applegate
4,816,191 A     3/1989   Berven
  (Continued)

FOREIGN PATENT DOCUMENTS

CN        1261594      8/2000
CN        1796358      7/2006
  (Continued)

OTHER PUBLICATIONS

CN 108097178 A machine translation (Year: 2018).*
  (Continued)

*Primary Examiner* — T. Bennett Mckenzie
(74) *Attorney, Agent, or Firm* — Dilworth IP, LLC

(57) ABSTRACT

A vertical absorption column comprising a liquid distributor comprising a feed box having a serrated weir for distribution of a liquid through upward-pointing serrations of the serrated weir into perforated trays of the liquid distributor and located directly above a structured packing, a structured packing, a plate packing comprising a plurality of horizontal plates, provided with cooling means, an inlet for the addition of oxygen to the lower part of the vertical absorption column, an inlet for the process gas comprising nitrogen oxides from an ammonia oxidation process at the lower part of the vertical absorption column, an inlet for an aqueous solution at the upper part of the vertical absorption column, at least one nitric acid outlet at the bottom of the vertical absorption column and an outlet for tail gas comprising nitrogen oxides at the top of the vertical absorption column.

17 Claims, 4 Drawing Sheets

(51) Int. Cl.

| | |
|---|---|
| *B01D 53/18* | (2006.01) |
| *B01D 53/56* | (2006.01) |
| *B01D 53/78* | (2006.01) |
| *B01J 19/32* | (2006.01) |
| *C01B 21/40* | (2006.01) |

(52) U.S. Cl.
CPC ............. *B01D 53/56* (2013.01); *B01D 53/78* (2013.01); *B01J 19/32* (2013.01); *B01D 2252/103* (2013.01); *B01J 2219/32213* (2013.01); *B01J 2219/32255* (2013.01); *B01J 2219/32408* (2013.01)

(58) Field of Classification Search
CPC .... B01D 2252/103; B01D 53/18; B01J 19/32; B01J 2219/32213; B01J 2219/32255; B01J 2219/32408
USPC .......................................................... 95/149
See application file for complete search history.

(56) References Cited

U.S. PATENT DOCUMENTS

| | | | | |
|---|---|---|---|---|
| 5,017,348 | A | 5/1991 | Lerner | |
| 5,167,773 | A * | 12/1992 | Eagan | B01D 3/143 196/100 |
| 6,165,435 | A | 12/2000 | Echegaray | |
| 6,610,268 | B1 * | 8/2003 | Young | C22B 3/18 423/522 |
| 2012/0248635 | A1 * | 10/2012 | Wolf | F28F 13/12 261/108 |
| 2013/0328222 | A1 * | 12/2013 | Franz | B01D 53/185 261/74 |
| 2014/0065025 | A1 * | 3/2014 | Suchak | C01B 13/16 422/162 |
| 2014/0158519 | A1 * | 6/2014 | Chen | F25J 3/04909 261/108 |
| 2014/0166110 | A1 * | 6/2014 | Nieuwoudt | F28F 25/04 261/23.1 |
| 2016/0158688 | A1 * | 6/2016 | Udatsu | B01D 53/18 96/242 |

FOREIGN PATENT DOCUMENTS

| | | | | |
|---|---|---|---|---|
| CN | 201271518 | | 7/2009 | |
| CN | 201760118 | | 3/2011 | |
| CN | 102068881 | | 5/2011 | |
| CN | 206660895 | | 11/2017 | |
| CN | 108097178 | | 6/2018 | |
| CN | 108097178 | A * | 6/2018 | ........... B01J 8/0278 |
| DE | 4034752 | A1 | 5/1992 | |
| DE | 4035205 | A1 | 5/1992 | |
| DE | 10336386 | | 3/2004 | |
| EP | 0256533 | A2 | 2/1988 | |
| GB | 668293 | | 3/1952 | |
| WO | 02083260 | A2 | 10/2002 | |
| WO | WO-2008132096 | A1 * | 11/2008 | ............. B01D 3/166 |
| WO | 2020169465 | A1 | 8/2020 | |

OTHER PUBLICATIONS

International Preliminary Report on Patentability issued in App. No. PCT/EP2021/061153, dated Apr. 5, 2022, 10 pages.
International Search Report and Written Opinion issued in App. No. PCT/EP2021/061153, dated Aug. 20, 2022, 17 pages.
Decanini et al., "Absorption of nitrogen oxides in cols. equipped with low-pressure drops structured packings", Ind. Eng. Chem. Res. 2000, 39, 5003-5011.
Kankani et al., "Process intensification in manufacture of nitric acid: NOx absorption using enriched and pure oxygen", Chemical Engineering Journal, 278 (2015) 430-446.
Choi, WH et al., "Radar absorbing serrated edge for broadband radar cross-section reduction", Microwave and Optical Technology Letters, vol. 62, No. 3, pp. 1112-1116, Nov. 11, 2019. 5 pages.
Li-Hong Song et al., "Simulation of the preparation process of ferric nitrate solution with low NO_x emission", Computers and Applied Chemistry, No. 07, pp. 537-542, Jul. 28, 2017. 7 pages.
Yang Yun-hu, "Research and design of a new type of continuous crushing equipment for ammonium nitrate", Gansu Metallurgy, No. 02, pp. 10-12, Apr. 15, 2016. 3 pages.
English translation of Chinese Office Action issued in App. No. CN202180025416, dated Nov. 24, 2023, 22 pages.
Office Action received for CO Patent Application No. NC2022/0013822, mailed on Oct. 7, 2025, 35 pages (18 pages of English Translation and 17 pages of Original document).

* cited by examiner

ABSORPTION COLUMN COMPRISING A FEED BOX HAVING A SERRATED WEIR AND A STRUCTURED PACKING AND PROCESS FOR THE PRODUCTION OF NITRIC ACID

TECHNICAL FIELD

The present invention relates to a vertical absorption column for the production of an aqueous nitric acid solution in a process for producing nitric acid, and a process for the production of an aqueous nitric acid solution in a process for producing nitric acid. More particularly, the invention relates to a vertical absorption column and absorption process where nitrogen oxides are absorbed into water using a structured packing and a specially designed liquid distributor which is new for use in said process and absorption column.

BACKGROUND OF THE INVENTION

Pure nitric acid is a clear, colourless liquid with a strong odour. Nitric acid is produced in large quantities principally by catalytic oxidation of ammonia (Ostwald process). Ammonia is converted to nitric acid in two stages. First, ammonia is oxidized on platinum webs, producing nitric oxide and water (Formula 1):

$$4NH_3(g)+5O_2(g) \rightarrow 4NO(g)+6H_2O(g) \qquad (1)$$

The reaction product from formula 1, nitric oxide (NO), is then oxidized to nitrogen oxides NOR, in particular nitrogen dioxide $NO_2$ (g) and further to dinitrogen tetroxide $N_2O_4$ (g) according to Formula 2 and 3:

$$2NO(g)+O_2(g) \rightarrow 2NO_2(g) \qquad (2)$$

$$2NO_2(g)N_2O_4(g) \qquad (3)$$

The oxidation of NO to nitrogen oxides $NO_x$ (defined herein as at least comprising nitrogen dioxide $NO_2$ and dinitrogen tetroxide $N_2O_4$) in nitric acid plants is currently carried out by a combination of two methods: gas cooling, which shifts the equilibrium towards $NO_2$ formation; and providing sufficient residence time to allow the homogeneous oxidation reaction to complete.

$NO_2$ and $N_2O_4$ are subsequently absorbed in water in an absorption column (also called absorption tower) to form nitric acid and nitric oxide (Formula 4 and 5):

$$3NO_2(g)+H_2O(l) \rightarrow 2HNO_3(aq)+NO(g) \qquad (4)$$

$$3N_2O_4(g)+H_2O(l) \rightarrow 4HNO_3(aq)+2NO(g) \qquad (5)$$

The residual nitric oxide is re-oxidized in the absorption column to nitrogen oxides for further conversion to nitric acid. The absorption efficiency achieved is generally in the range of 98.2 to 99.3%.

Using said process, weak nitric acid which is up to 68% (azeotrope) is obtained. Through a rectification process, the concentration of nitric acid can be increased up to 99% concentrated nitric acid.

The total reaction is given by the following Formula 6:

$$NH_3+2O_2 \rightarrow HNO_3+H_2O \qquad (6)$$

The tail gas of the absorption column, comprising the reaction product NO and unreacted $NO_2$ and $N_2O_4$, is usually treated in a "DeNOx unit" before being discharged into the environment. Without treatment, the tail gas gives rise to an air pollution problem and is recognized as a typical red-brown plume with a pungent odor, escaping from the top of an absorption column.

A typical absorption tower comprises 30 to 50 horizontal plates (also called trays) and only the top 8 to 9 plates are not cooled. Cooling is required for the other trays, since all of the reactions in the process for the production of nitric acid are exothermic.

The nitrogen oxide gases to be absorbed are sent to the absorption column counter-currently with respect to the water used for absorbing said nitrogen oxide gases. The nitric acid resulting from the absorption flows from the top to the bottom of the absorption column. The equilibrium for reaction (Formula 4), expressed in terms of the constituent partial pressures, is a function of temperature, with low temperatures favoring the formation of nitric acid. However, nitrogen dioxide rapidly forms an equilibrium mixture with its dimer, dinitrogen tetroxide, the latter being favored by low temperature and high pressure. The mechanisms and rate-controlling steps for acid formation change with concentration and extent of oxidation to dinitrogen tetroxide. At high concentrations of dinitrogen tetroxide (>40 wt %) $N_2O_4$ is the principal route to nitric acid formation. At lower concentrations of dinitrogen tetroxide, a combination of mechanisms involving $NO_2$, $N_2O_3$, and $HNO_2$ become more important. Hence, the absorption process involves a large number of reactive components in the gas phase and the reaction model is complicated but well-known to the skilled person.

The formation of nitric acid by the absorption of $NO_2$ or $N_2O_4$ in water generates nitric acid, the oxidation of which is carried out in different ways according to pressure in the absorption system. In a conventional modern medium dual pressure process nitric acid plant, pressurized process gas from the ammonia combustion is fed into the lower part of the absorption columns, which is normally a tray (plate) column, and passes upwards through the absorption column counter current to process water, which is introduced at the top of the column. Weak/diluted acid from condensed steam present in the process gas is introduced at a suitable height of the absorption column. In tray absorption columns, the oxidation of nitrogen oxide gases proceeds in the free spaces between the trays, and the absorption proceeds on the trays. The trays are bubble-cap plates or perforated (sieved) plates, on which the liquid is flowed, while the gas diffuses through small holes in the sieved tray or through the bubble-caps. The trays in the absorption column are provided with cooling means to remove the absorption heat, especially in the lower part of the column. The tail gas, containing nitrogen oxides, is treated for removing or lowering the content of nitrogen oxides in the flue gas, before being passed to an expansion turbine for recovering compression energy. Produced nitric acid is passed to a bleacher column where dissolved $NO_x$ gases in the nitric acid are stripped.

The principal effluent from a nitric acid plant is tail gas containing nitrogen oxides from the absorber. The emissions of tail gas can be minimized by optimizing process conditions, increasing the efficiency of absorption, and/or using special tail gas treatment methods. Investments for nitrogen oxides abatement are to a certain extent recovered by increased yield of nitric acid product. However, the requirement for reduced nitrogen oxide emissions is often compromised with economic and production requirement.

The design of absorption columns for nitric acid production is a specialized process requiring individual tailoring on each absorption step for its cooling requirements and the air or other oxygen-containing gas volumes containing oxygen needed for oxidation of the nitrogen oxides. The traditional process for nitric acid production requires significant investments, and the plant makes a large footprint. Therefore, there is a desire of providing a more efficient process for producing nitric acid process compared to the traditional industry, further there is a desire to reduce the footprint of the nitric acid plant. More importantly, for environmental reasons, there is a need of a more sustainable production of nitric acid, therefore the content of nitrogen oxide gases in the tail gas should be minimized.

PRIOR ART

In EP 0256533 A (Norsk Hydro, 28 Oct. 1992) a method and an apparatus for reduction of the nitrogen oxide content below 200 ppm in effluent gases from an absorption column for the manufacture of nitric acid is described. In order to obtain less nitrogen dioxide ($NO_2$) in the effluent gas, the relation between the contact area and free gas space is adjusted by increasing the overflow height of the liquid level and oxidation spaces between the plates. Also reducing the height of the space above the uppermost plate, leads to less oxidation of NO to $NO_2$.

WO 02/083260 A2 (Koch-Glitsch LP, 24 Oct. 2002) discloses a liquid distributor in a mass transfer column that distributes liquid to an underlying mass transfer bed containing one or more random, grid or structured packing elements. A serrated weir is used for distribution of liquid through downward-pointing serrations of the serrated weir into the underlying mass transfer bed. The use in an absorption tower in an absorption stage of the nitric acid production process is not mentioned, nor is the use of a serrated weir for distribution of liquid through upward-pointing serrations of the serrated weir into perforated trays of the liquid distributor.

U.S. Pat. No. 4,816,191 (Koch Engineering Company, 28 Mar. 1989) discloses a liquid distributor for a gas-liquid contact column which also comprises a serrated weir for distribution of liquid through downward-pointing serrations of the serrated weir into the underlying column. Structured packings are not mentioned.

WO 2020/169465 A1 (Yara International ASA, 2020) discloses a vertical bleaching tower for removing dissolved nitrogen oxides from an aqueous nitric acid solution using a stripping gas such as air, nitrogen, oxygen or combinations thereof in a process for producing nitric acid, comprising a structured packing; a liquid distributor comprising a feed box having a serrated weir for distribution of the aqueous nitric acid solution comprising the dissolved nitrogen oxides through upward-pointing serrations of the serrated weir into perforated trays of the liquid distributor and located above the structured packing for distributing the aqueous nitric acid solution comprising the dissolved nitrogen oxides to the structured packing; an inlet and outlet, both suitable for aqueous nitric acid solution; and an inlet and outlet, both suitable for the stripping gas. It does not disclose the combination of both trays and structured packing. It also does not disclose a separate inlet for the addition of oxygen gas to the bleaching tower.

The usage of structured packing in mass transfer columns is generally known, e.g. in distillation processes, separation and some absorption processes (see for the latter e.g. Decanini et al. Ind. Eng. Chem. Res. 2000, 39, 5003-5011). While structured packing has advantages over conventional packing or other internal elements in a column, there are several aspects which has influenced the usage of structured packing in mass transfer processes, such as a significantly higher cost, difficulties in operating e.g. due to flooding conditions and heat control, to mention some. Structured packing has not been utilized in absorption columns in the nitric acid production process. Due to the exothermic absorption reactions the absorption heat would be very high in an absorption column equipped with structured packing, and external cooling would have to be provided, complicating the overall process.

There remains, therefore, a need for an absorption column that allows for more efficient absorption of nitrogen oxide gases, that allows in return for reducing the dimensions of the absorption column and/or reduced nitrogen oxide emissions at the outlet of the absorption tower.

SUMMARY OF INVENTION

According to a first aspect of the disclosure, there is disclosed a vertical absorption column, for the absorption of nitrogen oxides from a process gas comprising said nitrogen oxides into water, for the production of an aqueous nitric acid solution. The absorption column comprises:

- a liquid distributor comprising a feed box having a serrated weir for distribution of a liquid through upward-pointing serrations of the serrated weir into perforated trays of the liquid distributor and located directly above a structured packing;
- a structured packing;
- a plate packing comprising a plurality of horizontal plates, provided with cooling means;
- an inlet for the addition of oxygen to the lower part of the vertical absorption column;
- an inlet for the process gas comprising nitrogen oxides from an ammonia oxidation process at the lower part of the vertical absorption column;
- an inlet for an aqueous solution at the upper part of the vertical absorption column;
- at least one nitric acid outlet at the bottom of the vertical absorption column; and
- an outlet for tail gas comprising nitrogen oxides at the top of the vertical absorption column.

Surprisingly, the inventors have now found that a structured packing in the absorption column in combination with a liquid distributor comprising a feed box having a serrated weir for distribution of liquid through upward-pointing serrations of the serrated weir into perforated trays of the liquid distributor, allows for more efficient absorption of nitrogen oxide gases, that allows in return for reducing the dimensions of the absorption column and/or reduced nitrogen oxide emissions at the outlet of the absorption tower.

According to a second aspect of the disclosure, an absorption method is disclosed for the production of an aqueous nitric acid solution by the absorption of nitrogen oxides from a process gas comprising nitrogen oxides into water in a vertical absorption column according to the disclosure. The method comprises the steps of

- introducing the aqueous solution in the top of the vertical absorption column though a liquid distributor;
- wherein the aqueous solution preferably is process water, substantially devoid of nitrogen oxides;
- allowing the aqueous solution to travel downwards into the vertical absorption column through the structured packing and the plate packing; and
- contacting the aqueous solution with process gas comprising nitrogen oxides from an ammonia oxidation process moving in a counter-current direction to the aqueous solution through the structured packing and the plate packing.

According to a third aspect of the disclosure, a method for producing nitric acid is disclosed. The method comprises the steps of:

oxidizing ammonia to produce nitric oxide;

oxidising nitric oxide to other nitrogen oxides, predominantly $NO_2$ and $N_2O_4$;

absorbing the nitrogen oxides in water in a vertical absorption column according to the absorption column of the disclosure to produce an aqueous nitric acid solution;

removing dissolved nitrogen oxides from the aqueous nitric acid solution using a bleaching column;

returning the removed nitrogen oxides to the absorption column according to the absorption column of the disclosure for subsequent conversion of the removed nitrogen oxides to nitric acid.

According to a fourth aspect of the disclosure, a method is disclosed for minimizing the amount of nitrogen oxide gases in the tail gas from a vertical absorption column according to the disclosure, in an absorption method according to disclosure or in a method according to the disclosure for producing nitric acid. The method comprises the steps of:

maintaining the temperature of the 2 to 5 uppermost horizontal plates in a range of from 5 to 35° C., and/or maintaining the nitrogen oxides concentration in the process gas in the free space between the 2 to 5 uppermost horizontal plates to less than 5000 ppmv, preferably between 100 and 5000 ppmv, more preferably between 100 and 2000 ppmv, even more preferably between 150 and 250 ppmv.

According to a fifth aspect of the disclosure, there is disclosed the use of a vertical absorption tower according to the disclosure, for the absorption of nitrogen oxides from a process gas comprising said nitrogen oxides into an aqueous solution for the production of an aqueous nitric acid solution in a process for producing nitric acid.

According to a sixth aspect of the disclosure, there is disclosed the use, in a vertical absorption tower according to the disclosure, for the absorption of nitrogen oxides from a process gas comprising said nitrogen oxides into water for the production of an aqueous nitric acid solution in a process for producing nitric acid, of a structured packing in combination of a liquid distributor comprising a feed box having a serrated weir for distribution of the liquid through upward-pointing serrations of the serrated weir into perforated trays of the liquid distributor and located directly above the structured packing for distributing the liquid to the structured packing.

DETAILED DESCRIPTION OF THE INVENTION

Figure 1:
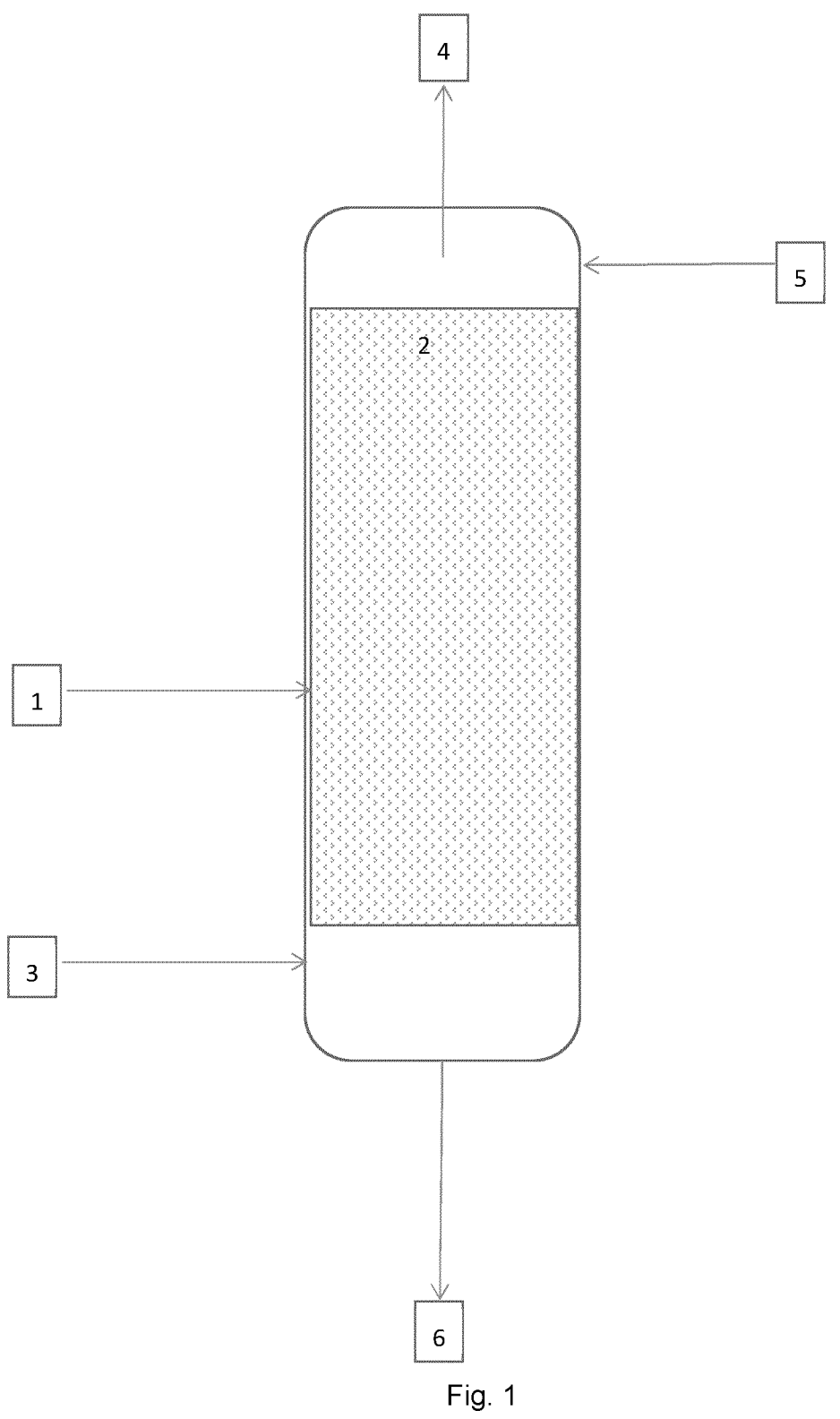
FIG. 1 shows a schematic representation of the absorption tower according to the disclosure.

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The term "ranges from . . . to . . . " or between as used when referring to a range for a measurable value, such as a parameter, an amount, a time period, and the like, is intended to include the limits associated to the range that is disclosed.

According to a first aspect of the disclosure, a vertical absorption column for the absorption of nitrogen oxides from a process gas comprising said nitrogen oxides into water for the production of an aqueous nitric acid solution. The absorption column comprises:

a liquid distributor comprising a feed box having a serrate weir for distribution of a liquid through upward-pointing serrations of the serrated weir into perforated trays of the liquid distributor and located directly above a structured packing;

a structured packing;

a plate packing comprising a plurality of horizontal plates, provided with cooling means;

an inlet for the addition of oxygen to the lower part of the vertical absorption column;

an inlet for the process gas comprising nitrogen oxides from an ammonia oxidation process at the lower part of the vertical absorption column;

an inlet for an aqueous solution at the upper part of the vertical absorption column;

at least one nitric acid outlet at the bottom of the vertical absorption column; and an outlet for tail gas comprising nitrogen oxides at the top of the vertical absorption column.

As defined herein, an aqueous solution is selected from the group consisting of water, or up to 0.5 weight % nitric acid in water, or up to 1 weight % ammonium nitrate in water or combinations thereof.

Figure 3:
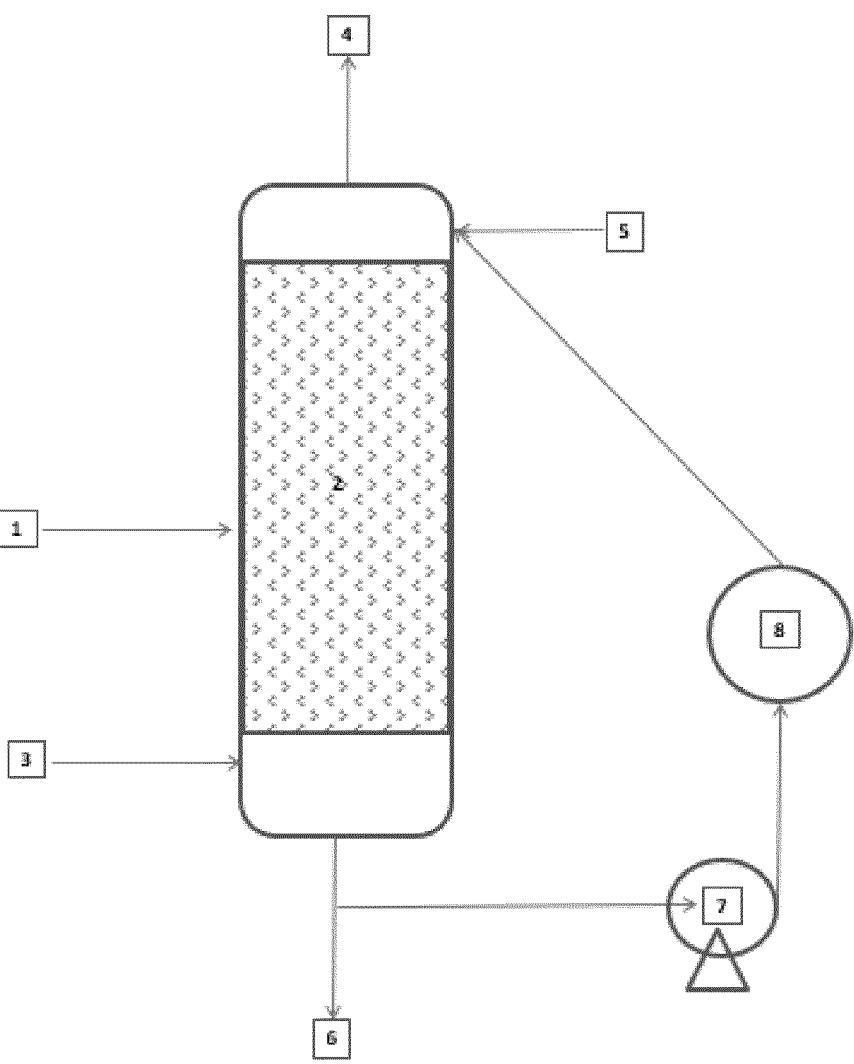
FIG. 3 shows the a schematic representation of the absorption tower according to the disclosure with a recirculation loop for the nitric acid.

Reference can be made to FIGS. 1 and 3 showing an absorption tower 1 according to the disclosure and comprising a structured packing 2, an inlet for the process gas, an outlet for tail gas 4, a water or nitric acid condensate or ammonium nitrate condensate inlet 5 and a nitric acid outlet 6.

Surprisingly, the inventors have now found that a structured packing in the absorption column in combination with a liquid distributor comprising a feed box having a serrated weir for distribution of liquid through upward-pointing serrations of the serrated weir into perforated trays of the liquid distributor, allows for more efficient absorption of nitrogen oxide gases, that allows in return for reducing the dimensions of the absorption column and/or reduced nitrogen oxides emissions at the outlet of the absorption tower.

Figure 2:
FIG. 2 shows a schematic representation of the structured packing that is used in the absorption tower according to the disclosure.

Examples of structured packings are corrugated thin metal sheets (e.g. 1-2 mm thick), expanded metal structures, wire gauze, wherein sheets are arranged vertically and corrugations are oriented at an angle to the vertical axis (FIG. 2). The corrugated metal sheets can be perforated and/or have textured surface. The material of the structured packing should withstand the corrosive environment and temperature in the absorption column over a prolonged time. Suitable materials are acid resistant stainless steels, suitable plastic materials and titanium. Further, the structured packing section should have a mechanical strength sufficient to support the weight of the packing and the liquid at the operating conditions.

Figure 4:
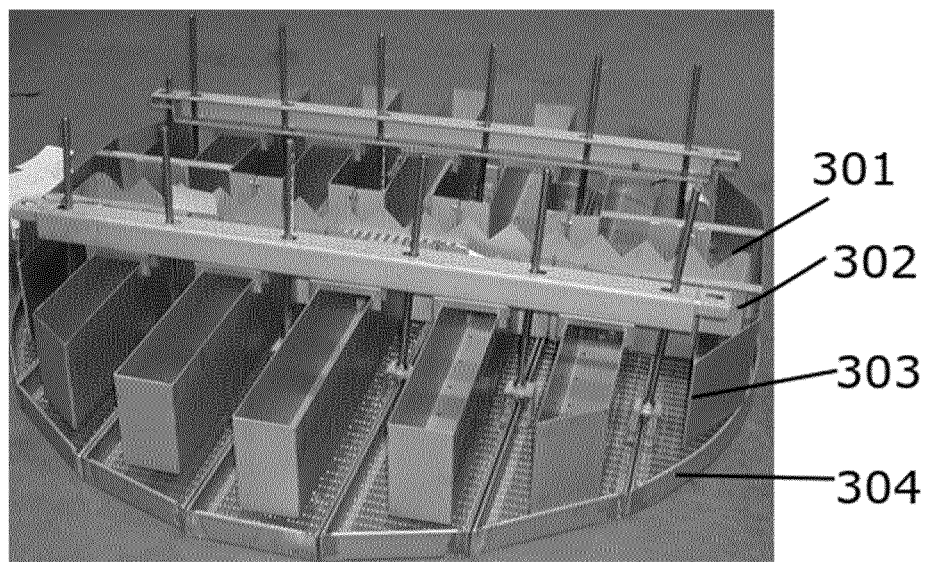
FIG. 4 is an image showing an example of a liquid distributor for use in combination with structured packing in an absorption tower showing the upward-pointing serrated weir.

FIG. 4 is a picture showing a liquid distributor for use in combination with structured packing in a vertical absorption tower of a nitric acid production process, according to the present disclosure. The liquid distributor comprises the following elements: serrated weir 301, feed box 302, tray(s) 303 and grid 304. The liquid distributor is placed on top of structured packing in a vertical absorption tower in a column/tower of a chemical plant. The aqueous solution is fed to the feed box 302. The aqueous solution is distributed into the perforated trays through the serrated weir. There are many small holes in the bottom of the perforated trays. Thus, the distribution of the aqueous solution into the perforated trays is optimized, the surface area between the aqueous solution and the nitrogen oxide gas is optimized, the amount of nitrogen oxide flow to the absorption section is kept minimal, and the pressure drop is optimized.

Figure 5:
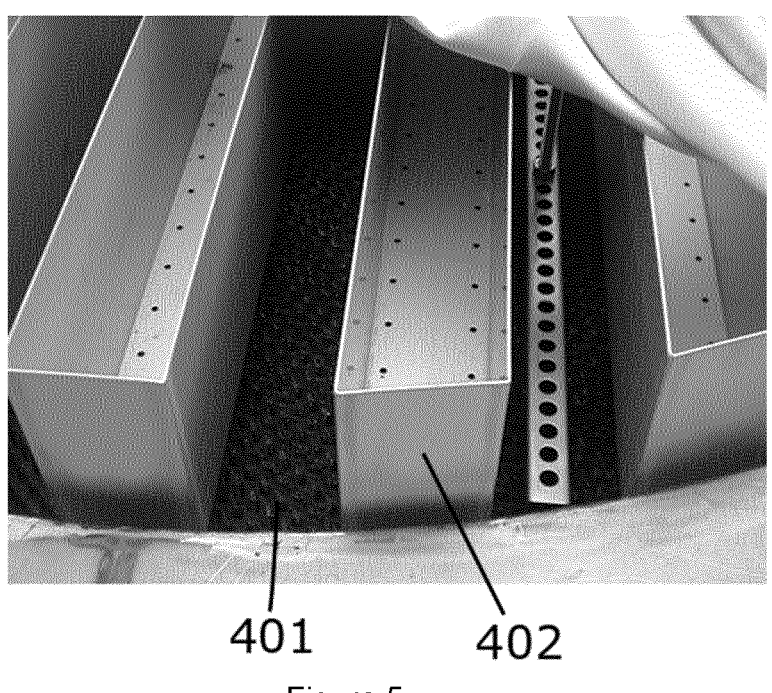
FIG. 5 is an image showing perforated trays of the liquid distributor placed directly on a structured packing in a vertical absorption tower.

FIG. 5 is a picture showing perforated liquid distributor trays 402, where the perforated trays 402 are placed directly on a structured packing 401.

The liquid distributor comprises a feed box to receive the aqueous solution entering the absorption tower. The aqueous solution is distributed from the feed box into perforated trays.

The feed box has upward-pointing serrated weir. The serrated weir may be located at one or both of the longitudinal edges of the feed box. The aqueous solution is distributed from the feed box through the serrations and into the perforated trays. The use of the serrated weir and its positioning within the distributor will further contribute to the optimization of the mass transfer between the nitrogen oxides and the aqueous solution.

Various shapes of the serrations of the weirs may provide the same or similar effect, such as V-shaped, castellated shape, U-shaped serrations. By the term "serrated weir" it should be understood that this does not only comprise a sawtooth-shape, but also other non-linear shapes providing the same or similar distributing effect of the aqueous solution.

In a further embodiment, the feed box may have holes in the bottom and/or the walls for distribution of the aqueous solution to the perforated trays. The holes may be circular, or may have the shape of vertical or horizontal slits.

The bottom of the feed box may be located at a higher location than the perforated trays. In another embodiment, the bottom of the feed box may be located at the same height as the bottom of the perforated trays. If the feed box comprises serrated weir, the serrations must be located higher than the upper edge of the perforated trays.

Perforated liquid distribution trays can be placed on support grids or directly on a structured packing.

According to the present disclosure, a section of an absorption column of the prior art, having conventional trays and lacking any structured packing, is replaced with a section of structured packing. By substituting the conventional trays with structured packing in the section of the absorption column, the dimensions of the absorption column can be significantly reduced, especially the height of the column can be significantly reduced. Further, by substituting the conventional trays with structured packing in a section, the amount of nitrogen oxide gases in the tail gas is substantially reduced, which also leads to an improved yield in the nitric acid production process. The very large surface area of the structured packing section provides a very large gas-liquid interface, enabling high mass transfer. The large gas-liquid interface leads to a highly increased absorption efficiency of nitrogen oxide gases in the liquid compared to the conventional absorption trays. Further, the large gas-liquid interface also leads to an increased rate of the desorption and oxidation of the formed nitrogen oxide gases. For a case where an absorption column consisting essentially of unstructured packing in the form of sieve trays was modified to comprise structured packing, the nitrogen oxide emissions were estimated to be reduced from 5200 ppm downwards to 3200 ppm.

According to one embodiment of the absorption column of the disclosure, the liquid distributor and the structured packing are arranged between the water inlet and an uppermost horizontal plate of the plate packing, and the liquid is water.

It is particularly advantageous to have the structured packing located in the uppermost part of the absorption tower. Indeed, the heat of absorption resulting from the absorption of nitrogen oxide gases in water or dilute nitric acid is at its maximum at the bottom of an absorption tower where the entering gases are at a very high temperature and at their maximum concentration inside the tower. Consequently, the absorption of nitrogen oxide gases is at its maximum at the bottom of an absorption tower. The maximum heat of absorption is, therefore, generated at the bottom of the absorption tower and can only be efficiently recovered if a sufficiently cold cooling medium such as water or ammonia is used, using a heat exchange system. Sufficient cooling of the water will represent significant costs. Hence, maximizing the absorption at the bottom of the absorption tower implies associated costs in the energy used in cooling the water used in the heat exchange system for recovering the heat of absorption resulting from the absorption of nitrogen oxide gases.

In contrast, in the uppermost part of the tower, the concentration of nitrogen oxide gases is decreased with regard to the concentration of nitrogen oxide gases entering the absorption tower at its bottom: indeed as the nitrogen oxide gases travel from the bottom to the top of the tower, their concentration decreases as they are progressively absorbed through the horizontal plates constituting the plate packing. Therefore, the absorption of the nitrogen oxide gases at the top of the absorption tower is expected to be less efficient than at the bottom of the tower. Therefore, the use of structured packing is particularly encouraged in the uppermost part of the tower. In addition, since the concentration of nitrogen oxide gases in the uppermost part of the absorption tower is lower than the corresponding concentration at the bottom of the absorption tower, the generated heat of absorption of the nitrogen oxide gases is lower such that a heat exchange system with, for example, water at a temperature ranging from 5 to 45° C., will suffice for recovering the heat of absorption.

The present inventors found that substituting the top section of a conventional absorption column lacking structured packing, with structured packing will lead to a significantly reduced concentration of nitrogen oxide gases in the tail gas, thus increasing the yield of the nitric acid production process. Given the high production volumes in a nitric acid production plant, such increased yield would constitute significant savings both in terms of more produced nitric acid, but also in terms of less need of nitrogen oxides abatement. By arranging the structured packing at the top section of the absorption column, cooling by heat exchanging is not required. The process water added above the structured packing will provide sufficient cooling of the structured packing section in order for the reactions to proceed in an efficient way. In particular, the absorption tower may comprise fifty trays and the eight to nine uppermost trays inside the absorption tower comprise structured packing and are not cooled.

The absorption efficiency being maximized at the top, it is then possible to operate with a reduced diameter of the top section. Thus, one embodiment of the absorption column according to the present invention comprises a new design of the top section of the absorption column.

According to one embodiment of the absorption column of the disclosure the oxygen is oxygen gas and the inlet for the process gas and the inlet for the addition of oxygen gas are separate inlets. By providing extra oxygen, preferably as oxygen gas, more NO is converted to nitrogen oxides. This effect is known from Kankani et al., Chemical Engineering Journal, 278 (2015) 430-446. Advantageously, the absorption column of the disclosure is designed to cope with the increased amount of nitrogen oxides, thus again increasing the absorption efficiency.

According to one embodiment of the absorption column of the disclosure, the liquid distributor and the structured packing are arranged between a lowermost horizontal plate of the plate packing and the inlet of process gas containing nitrogen oxides, and the liquid is an aqueous solution of nitric acid.

Since the concentration of nitrogen oxides gases is highest at the bottom of the column, it is particularly important to have an efficient absorption in this bottom part of the tower, in order to avoid nitrogen oxide emissions exiting the tower.

According to one embodiment of the absorption column of the disclosure, the absorption column further comprises means for measuring the temperature of the aqueous nitric acid solution on one or more horizontal plates of the plate packing and, preferably, further comprises means for measuring the concentration of nitrogen oxide gases in the free space between two adjacent horizontal plates of the plate packing. The temperature means are particularly useful in order to calculate the expected heat resulting from the absorption of the nitrogen oxide gases into the absorption liquid and ensure that the temperature of the cooling medium in a heat exchange system is appropriate for recovering this heat of absorption. Furthermore, as described with respect to the measurement of the temperature of the nitrogen oxide gases, the concentration measurement of the nitrogen oxide gases shall enable the person skilled in the art to calculate the expected heat resulting from the absorption of the nitrogen oxides in the absorption liquid, and to ensure that the operating conditions of the heat exchange system for recovering the heat generated from the absorption of the nitrogen oxide gases are optimal. A further benefit is the fact that it is possible to tune the absorption and abatement parameters of the technology to not exceed the permitted emission levels.

According to one embodiment of the absorption column of the disclosure, the cooling means are one or more cooling coils, comprising a cooling medium, superposed on an horizontal plate of the plate packing. This design and layout assures an optimum heat transfer between the absorption medium and the cooling medium. Preferably, the cooling means are one or more cooling coils and the cooling coils are selected from bare tubes, staggered tubes, finned tubes, or any combination thereof. Such a system has been found to optimally achieve the maximum recovery of the heat generated from the absorption of nitrogen oxide gases. Preferably, the initial temperature of the cooling medium in the cooling coils is between 5 to 45° C. Within such a temperature range, maximum recovery of the heat generated from the absorption of nitrogen oxide gases is achieved.

According to one embodiment of the absorption column of the disclosure, the structured packing has a surface area of at least 250 $m^2/m^3$, preferably 450 to 750 $m^2/m^3$. Maximum absorption of the nitrogen oxide gases is achieved under those conditions.

According to one embodiment of the absorption column of the disclosure, the liquid distributor has a drip-point density of at least 30 dripping points per $m^2$, preferably from 60 to 200 dripping points per $m^2$. Maximum absorption of the nitrogen oxide gases is achieved under those conditions.

According to one embodiment of the absorption column of the disclosure, the structured packing is made of acid resistant stainless steel, titanium, or other acid compatible materials. In this manner, maintenance and replacement of the structured packing is minimized through increased lifetime of the packing.

According to a second aspect of the disclosure, an absorption method is disclosed for the production of an aqueous nitric acid solution by the absorption of nitrogen oxides from a process gas comprising nitrogen oxides into an aqueous solution in a vertical absorption column according to the disclosure, comprising the steps of introducing an aqueous solution in the top of the vertical absorption column though a liquid distributor;

wherein the aqueous solution preferably is process water, substantially devoid of nitrogen oxides;

allowing the aqueous solution to travel downwards into the vertical absorption column through the structured packing and the plate packing; and contacting the aqueous solution with process gas comprising nitrogen oxides from an ammonia oxidation process moving in a counter-current direction to the aqueous solution through the structured packing and the plate packing.

The absorption method includes the use of the vertical absorption column of the disclosure, using conventional steps that are also applicable to conventional columns. However, the method according to the disclosure provides for a better absorption of the nitrogen oxide gases in the aqueous solution used as the absorption liquid, and is hence more efficient. As the aqueous solution, water, such as process water, but also nitric acid or ammonium nitrate in water, can be used. Preferably, process water is used as the aqueous solution. In this manner, the absorption of the nitrogen oxide gases will be maximized since, the water being devoid in nitrogen oxides, there will be maximum capacity for absorbing the gases prior to the equilibrium concentrations of the nitrogen oxides in the gas phase and in the water.

Reference is made to FIG. 3. According to one embodiment according to the absorption method of the disclosure, the method further comprises the step of returning part of the produced nitric acid to the top of the vertical absorption column where the aqueous solution is introduced through a liquid distributor and the aqueous solution consists of water and the produced nitric acid. In this manner, both the weight of the aqueous solution, hence the ratio of the weight of the nitrogen oxides over the weight of the aqueous solution, and the concentration of the produced nitric acid can be effectively controlled. In particular, as shown in FIG. 3, part of the produced nitric acid is returned to the inlet 5, through a pump 7 and after having been cooled through cooler 8.

According to one embodiment of the absorption method of the disclosure, the method further comprises the step of providing oxygen to the lower part of the vertical absorption column. By providing extra oxygen, more NO is converted to nitrogen oxides. This effect is known from Kankani et al., Chemical Engineering Journal, 278 (2015) 430-446. Beneficially, the absorption column of the disclosure is designed to cope with the increased amount of nitrogen oxides, thus again increasing the absorption efficiency.

According to one embodiment of the absorption method of the disclosure, the process gas comprising nitrogen oxides from an ammonia oxidation process moving in a counter-current direction to the aqueous solution is in a process gas/aqueous solution ratio of ranging from 2.5 kg gas/kg aqueous solution to 25 kg gas/kg aqueous solution.

According to one embodiment of the absorption method of the disclosure, the pressure drop over the vertical absorption column is ranging from 20 mbar to 500 mbar, preferably from 20 mbar to 85 mbar. Another important parameter, besides the liquid temperature, influencing the yield of the absorption process is the pressure in the absorption column, which should preferably be between 9-11 bar (900-1100 kPa) in a dual pressure absorption column. The pressure drop over the structured packing, with the same height, is lower than the pressure drop over the sieve tray with the liquid layer. Therefore, use of structured packing will maintain higher pressure throughout the absorption column. The higher pressure at the top of the column improves the absorption of nitrogen oxides and reduces their emissions. The concentration of the produced nitric acid increases with increased pressure in the absorption column. For production reasons, as well as operating costs, the pressure drop over the absorption column should be as low as possible.

According to a third aspect of the disclosure, a method for producing nitric acid is disclosed. The method comprises the steps of:

oxidizing ammonia to produce nitric oxide;
    oxidizing nitric oxide to nitrogen oxides, predominantly $NO_2$ and $N_2O_4$;
    absorbing the nitrogen oxides in water in a vertical absorption column according to the absorption column of the disclosure to produce an aqueous nitric acid solution;
    removing dissolved nitrogen oxides from the aqueous nitric acid solution using a bleaching column;
    returning the removed nitrogen oxides to the absorption column according to the absorption column of the disclosure for subsequent conversion of the removed nitrogen oxides to nitric acid.

According to a fourth aspect of the disclosure, a method is disclosed for minimizing the amount of nitrogen oxide gases in the tail gas from a vertical absorption column in the absorption method of the disclosure or in the method of the disclosure for producing nitric acid. The method comprises the steps of:

maintaining the temperature of the 2 to 5 uppermost horizontal plates in a range of from 5 to 35° C., and/or
    maintaining the nitrogen oxides concentration in the process gas in the free space between the 2 to 5 uppermost horizontal plates to less than 5000 ppmv, preferably between 100 and 5000 ppmv, more preferably between 100 and 2000 ppmv, even more preferably between 150 and 250 ppmv.

According to a fifth aspect of the disclosure, there is disclosed the use of a vertical absorption column according to the disclosure for the absorption of nitrogen oxides from a process gas comprising said nitrogen oxides into an aqueous solution for the production of an aqueous nitric acid solution in a process for producing nitric acid.

According to a sixth aspect of the disclosure, there is disclosed, the use in a vertical absorption tower according to the disclosure, for the absorption of nitrogen oxides from a process gas comprising said nitrogen oxides into the aqueous solution for the production of an aqueous nitric acid solution in a process for producing nitric acid, of a structured packing in combination of a liquid distributor comprising a feed box having a serrated weir for distribution of the liquid through upward-pointing serrations of the serrated weir into perforated trays of the liquid distributor and located directly above the structured packing for distributing the liquid to the structured packing.

EXAMPLES

Example 1

The combination of structured packing and liquid distributor has been investigated through computer simulations for a number of the inventor's absorption towers using water as the absorption liquid, and shows a substantial improvement in the concentration of nitrogen oxide gases in the tail gas leaving the absorption tower and increased acid production compared to original design of the towers with sieve tray or metal rings unstructured packing. The results are shown in Table 1 below. The structured packing equipped with the serrated liquid distributors were obtained from Sulzer (Winterthur, Switzerland).

TABLE 1

| Structured packing | Unit | A |
| --- | --- | --- |
| Tower diameter | m | 5.2 |
| Packing height | m | 12.6 |
| Absorption pressure | bar | 1.94 |
| Nitrogen oxides in tail gas | ppm | 3200 |
| Reduction of nitrogen oxides in tail gas | % | 38% |
| Increased acid production | % | 2.7 |

13

14

As a reference for the improvements, some data for the original absorption towers are given below:

TABLE 2

| Unstructured packing, ceramic Raschig rings | Unit | A' |
|---|---|---|
| Tower diameter | m | 5.2 |
| Packing height | m | 17.7 |
| Absorption pressure | bar | 1.94 |
| Nitrogen oxides in tail gas | ppm | 5200 |

The results clearly show improvement in reduction of nitrogen oxides in the tail gas and in increased acid production.

The invention claimed is:

1. A vertical absorption column for absorption of nitrogen oxides from a process gas comprising said nitrogen oxides into water for production of an aqueous nitric acid solution, comprising:

a structured packing;

a liquid distributor, located directly above the structured packing, comprising perforated trays and a feed box having a serrated weir for distribution of a liquid through upward-pointing serrations of the serrated weir into the perforated trays;

a plate packing comprising a plurality of horizontal plates, provided with cooling means;

an inlet for an addition of oxygen to a lower part of the vertical absorption column;

an inlet for the process gas comprising nitrogen oxides from an ammonia oxidation process at the lower part of the vertical absorption column;

an inlet for an aqueous solution at an upper part of the vertical absorption column;

at least one nitric acid outlet at a bottom of the vertical absorption column; and an outlet for tail gas comprising nitrogen oxides at a top of the vertical absorption column, wherein the liquid distributor and the structured packing are arranged between a lowermost horizontal plate of the plate packing and the inlet of process gas containing nitrogen oxides, and the aqueous solution is an aqueous solution of nitric acid.

2. The vertical absorption column according to claim 1, wherein the oxygen is oxygen gas.

3. The vertical absorption column of claim 2 wherein the inlet for the process gas and the inlet for the addition of oxygen are separate inlets.

4. The vertical absorption column according to claim 1, further comprising a temperature sensor for measuring the temperature of the aqueous solution on one or more horizontal plates of the plate packing.

5. The vertical absorption column according to claim 1, wherein the cooling means are one or more cooling coils, comprising a cooling medium, superposed on a horizontal plate of the plate packing, wherein an initial temperature of the cooling medium in the cooling coils is between 5 to 45° C.

6. The vertical absorption column according to claim 1, wherein the structured packing has a surface area of at least 250 $m^2/m^3$.

7. The vertical absorption column of claim 6 wherein the surface area of the structured packing is 450 to 750 $m^2/m^3$.

8. The vertical absorption column according to claim 1, wherein the liquid distributor has a drip-point density of at least 30 dripping points per $m^2$.

9. The vertical absorption column of claim 8 wherein the drip-point density is 60 to 200 dripping points per $m^2$.

10. The vertical absorption column according to claim 1, wherein the structured packing is made of acid resistant stainless steel, titanium, or other acid-compatible materials.

11. An absorption method for the production of an aqueous nitric acid solution by the absorption of nitrogen oxides from a process gas comprising nitrogen oxides into an aqueous solution in the vertical absorption column according to claim 1, comprising the steps of:

introducing the aqueous solution in the top of the vertical absorption column though the liquid distributor;

allowing the aqueous solution to travel downwards into the vertical absorption column through the structured packing and the plate packing; and contacting the aqueous solution with process gas comprising nitrogen oxides from an ammonia oxidation process moving in a counter-current direction to the aqueous solution through the structured packing and the plate packing.

12. The absorption method according to claim 11 further comprising the step of returning part of the produced nitric acid to the top of the vertical absorption column where the aqueous solution is introduced through the liquid distributor and wherein the aqueous solution consists of water and the produced nitric acid.

13. The absorption method according to claim 11, further comprising providing oxygen to the lower part of the vertical absorption column.

14. The absorption method according to claim 11, wherein the process gas comprising nitrogen oxides from an ammonia oxidation process moving in a counter-current direction to the aqueous solution is in a process gas/aqueous solution ratio ranging from 2.5 kg gas/kg solution to 25 kg gas/kg solution.

15. The absorption method according to claim 11, wherein the pressure drop over the vertical absorption column is between from 20 mbar to 500 mbar.

16. The absorption method of claim 15 wherein the pressure drop over the vertical absorption column is from 20 mbar to 85 mbar.

17. A method for producing nitric acid, comprising the steps of oxidizing ammonia to produce nitric oxide;

converting nitric oxide to nitrogen oxides;

absorbing the nitrogen oxides in water in the vertical absorption column according to claim 1 to produce an aqueous nitric acid solution;

removing dissolved nitrogen oxides from the aqueous nitric acid solution using a bleaching column;

returning the removed nitrogen oxides to the absorption column for subsequent conversion of the removed nitrogen oxides to nitric acid.

* * * * *